United States Patent [19]

Gilbert

[11] Patent Number: 4,979,721
[45] Date of Patent: Dec. 25, 1990

[54] CHECK VALVE HAVING COMBINED QUICK DISCONNECT WRENCH FLAT DEFINING RIDGE

[75] Inventor: Major H. Gilbert, Gladys, Va.
[73] Assignee: Bridge Products, Inc., Northbrook, Ill.
[21] Appl. No.: 444,672
[22] Filed: Dec. 1, 1989
[51] Int. Cl.$^5$ ............................................... F16L 37/28
[52] U.S. Cl. ................................... 251/149.6; 62/292; 137/515.5; 137/543
[58] Field of Search ............... 62/292; 137/515.5, 543; 251/149.6

[56] References Cited

U.S. PATENT DOCUMENTS

| | | | |
|---|---|---|---|
| 2,289,946 | 7/1942 | Weatherhead | 137/515.5 X |
| 2,548,528 | 4/1951 | Hansen | 251/149.6 |
| 2,594,641 | 4/1952 | Griffith . | |
| 2,845,945 | 12/1956 | Mancusi, Jr. . | |
| 2,943,639 | 7/1960 | Smith . | |
| 3,051,196 | 8/1962 | Miller . | |
| 4,182,370 | 1/1980 | Karcher | 62/292 X |
| 4,537,384 | 8/1985 | Petersen . | |

OTHER PUBLICATIONS

Sketch of a design for a check valve intended for use with an automotive air conditioner system, generated as a result of a meeting in may of 1988 incorporating suggestions from several individuals not employed by the assignee of present invention.
Catalog sheet of Aeroquip Corporation, p. 213, undated.
Copy of Applicant's drawing No. 446ASM C1, Oct. 1988.

*Primary Examiner*—Robert G. Nilson
*Attorney, Agent, or Firm*—Willian Brinks Olds Hofer Gilson & Lione

[57] ABSTRACT

A check valve of the type having a valve body and a valve pin mounted to slide in the valve body includes on its exterior surface a raised annular ridge. This ridge defines at least one pair of wrench flats and has first and second annular shoulders, each on a respective side of the ridge. The first shoulder is shaped to retain a quick disconnect coupler in position on the valve body. The overall length of the valve body can be reduced because the same annular ridge defines both the wrench flats and the shoulder that retains the quick disconnect coupler.

9 Claims, 2 Drawing Sheets

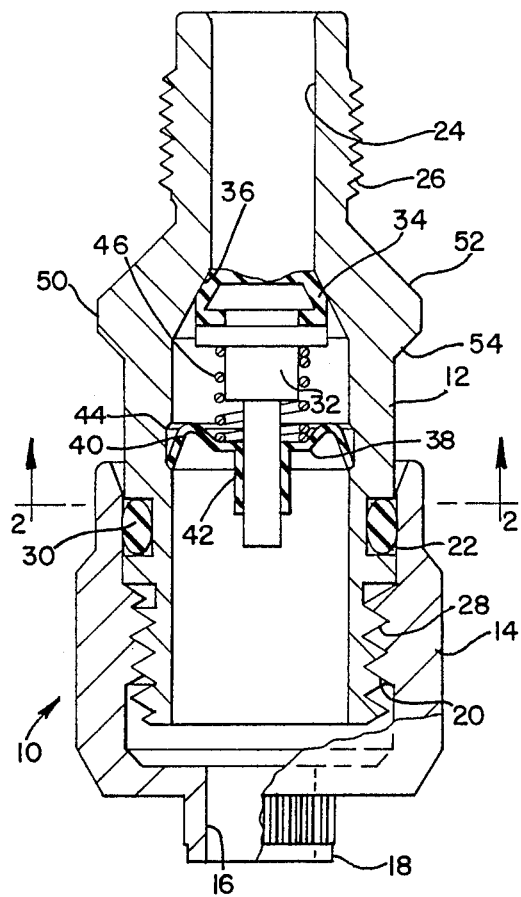
FIG_1_
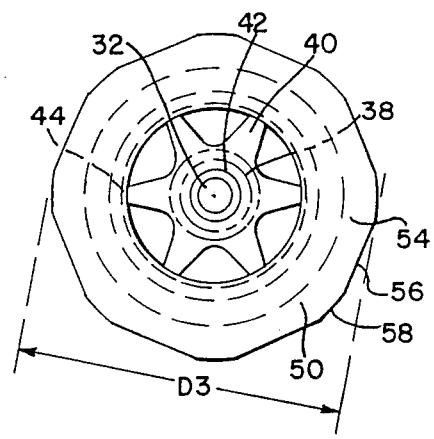
FIG_2_
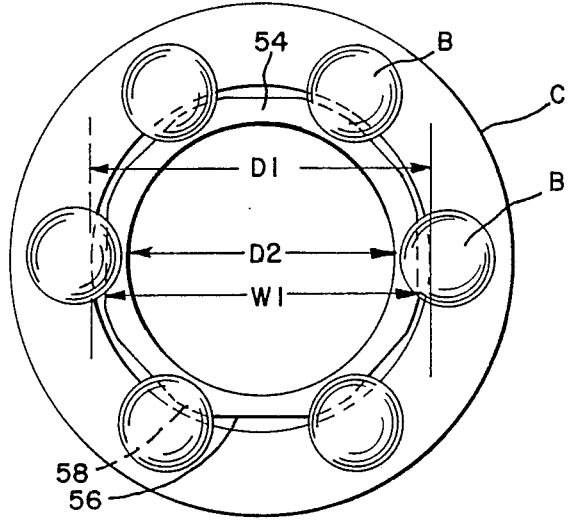
FIG_3_

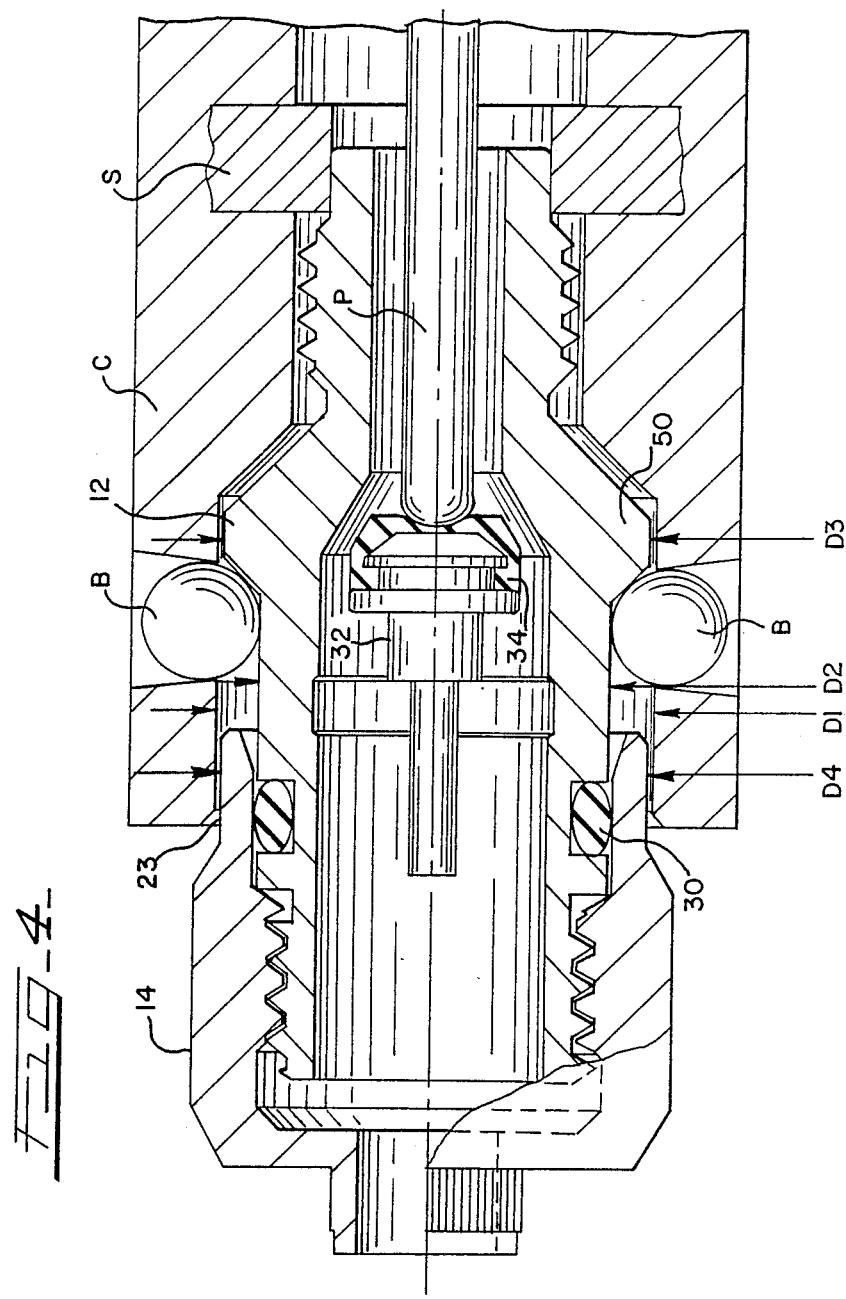

CHECK VALVE HAVING COMBINED QUICK DISCONNECT WRENCH FLAT DEFINING RIDGE

BACKGROUND OF THE INVENTION

This invention relates to an improvement to check valves of the type generally shown in Griffith U.S. Pat. No. 2,594,641. Such check valves have a valve body which defines an axially oriented through passageway, and an annular valve seat disposed around the passageway. A groove extends around at least part of the passageway, and a centering element is mounted in the groove to extend across the passageway and to support a central guide. A valve pin is mounted to slide in the central guide between a sealing position, in which the valve pin seals against the valve seat to close the through passageway, and an open position, in which the valve pin is spaced from the valve seat to permit flow through the passageway.

In the past, it has been suggested to use check valves of this type in automotive air conditioning lines. One such application requires the valve body to be shaped to engage a wrench so the valve body can be screwed into and removed from the air conditioning system. In addition, in this application the valve body must be shaped to engage a quick disconnect coupler, used in the automotive industry to connect a Freon charging line to the check valve body.

One obvious solution to this requirement is to provide a conventional annular quick disconnect shoulder on the valve body which is circular in cross section, and to provide an additional raised ridge on the check body to define wrench flats. The use of two separate annular ridges to perform the quick disconnect engaging function and the wrench engaging function may unnecessarily increase the overall length of the valve body and therefore the size and cost of the check valve.

SUMMARY OF THE INVENTION

According to this invention, a check valve of the type described above is provided with a raised annular ridge on the outside of the valve body. This ridge defines at least one pair of wrench flats as well as first and second annular shoulders, each on a respective side of the ridge. The first shoulder is shaped to retain a quick disconnect coupler in position on the valve body.

In the check valve of this invention the raised annular ridge simultaneously performs two functions: it defines wrench flats that allow the ridge and therefore the valve body to be engaged by a wrench as necessary to install and remove the check valve; and it defines a shoulder shaped to engage a quick disconnect coupler to hold the quick disconnect coupler on the valve body. In the past, it has been customary to use a circular annular ridge to engage a quick disconnect coupler. The present invention departs from this customary practice, and is based on the discovery that a surface that defines wrench flats can function reliably with conventional quick disconnect couplers.

By performing these two functions with a single annular ridge, the present invention provides a check valve which is remarkably short in overall length and therefore low in materials cost.

The invention itself, together with further objects and attendant advantages, will best be understood by reference to the following detailed description, taken in conjunction with the accompanying drawings.

BRIEF DESCRIPTION OF THE DRAWINGS

FIG. 1 is a cross sectional view in partial elevation of a check valve which incorporates the presently preferred embodiment of this invention.

FIG. 2 is a cross sectional view taken along line 2—2 of FIG. 1.

FIG. 3 is a partially schematic view in cross section showing the check valve of FIG. 1 locked in place to a quick disconnect coupler.

FIG. 4 is a partially schematic view in longitudinal section showing the check valve of FIG. 1 locked in place to a quick disconnect coupler.

DETAILED DESCRIPTION OF THE PRESENTLY PREFERRED EMBODIMENTS

Turning now to the drawings, FIG. 1 shows a sectional view of a check valve 10 which includes a valve body 12 and a port 14.

The port 14 defines a through passage 16 which terminates at its lower end in a projecting surface 18. The upper portion of the port 14 defines a set of internal threads 20 and an annular sealing surface 22. The port 14 is intended to be installed in a line, as for example in tubing of an air conditioning system. In such an installation the tubing is drilled, and the projecting surface 18 is placed into the drilled hole and brazed in place.

The valve body 12 defines a through passage 24, upper threads 26 and lower threads 28. The upper threads 26 are intended to secure a cap (not shown) in place, and the lower threads 28 threadedly engage the valve body 12 with the port 14. An O-ring seal 30 is captured in a groove adjacent the lower threads 28, and this O-ring seal 30 is dimensioned to seal against the sealing surface 22 when the valve body 12 is installed in the port 14 as shown in FIG. 1.

A core pin 32 is mounted in the through passage 24. This core pin 32 defines a sealing member 34 which is preferably molded in place on the core pin 32 as shown in FIG. 1. The sealing member 34 is shaped to seal against a valve seat 36 defined around the through passage 24 in the valve body 12.

The core pin 32 is held in place in the valve body 12 by a retainer 38. The retainer 38 defines radially extending legs 40 and a central cylindrical guide 42 as shown in FIGS. 1 and 2. The guide 42 is dimensioned to receive a portion of the core pin 32 to guide the core pin 32 in axial movement between a sealing position (as shown in FIG. 1) in which the sealing member 34 closes the through passage 24, and an open position (not shown) in which the sealing member 34 and the core pin 32 are moved downwardly from the position shown in FIG. 1 to permit flow through the through passage 24. The valve body 12 defines an internal groove 44 which receives the radially outward ends of the legs 40, to hold the retainer 38 and therefore the core pin 32 in the position shown in FIG. 1. A compression coil spring 46 is interposed between the retainer 38 and the core pin 32 to bias the core pin 32 to the position shown in FIG. 1.

The external surface of the valve body 12 defines an annular ridge 50 which comprises a front shoulder 52 and a rear shoulder 54. The perimeter of the ridge 50 is octagonal in shape, as shown in FIG. 2, and defines eight flats 56 which as described below serve as wrench flats for installation of the valve body 12 in the port 14. As best shown in FIG. 2, the flats 56 meet at external corners 58, and these external corners are relieved so as to reduce the maximum outside diameter D3 of the ridge 50.

The ridge 50 of the valve body 12 has been shaped to perform two separate functions. First, the flats 56 on the ridge 50 are shaped to engage a wrench (not shown) to apply a torque to the valve body 12 to either connect or disconnect the valve body 12 from the port 14.

In addition, the ridge 50 has been shaped to engage a quick disconnect coupler C (FIGS. 3 and 4) which is conventional, and forms no part of this invention. The coupler C is shown schematically in FIGS. 3 and 4 as including six bearings B. As the quick disconnect coupler C is installed on the valve body 12, the front shoulder 52 moves the bearings B radially outwardly so that they pass over the ridge 50. The coupler C includes means (not shown) for returning the bearings B to the position shown in FIGS. 3 and 4, in which they engage the rear shoulder 54 to hold the coupler C securely on the valve body 12. Such quick disconnect couplers C are conventionally used in the automotive industry to connect a check valve such as the check valve 10 to a Freon charging system in order to charge the associated air conditioner system (not shown) with Freon. FIG. 4 is partially schematic in that elements such as the spring 46 and the spider 40 are not shown. In FIG. 4 the reference symbols P and S are used to refer to an actuating pin and a seal that are included in the coupler C to seal against the upper end of the valve body 12 and to depress the core pin 32 during a Freon charging operation.

The ridge 50 has been carefully dimensioned to allow it to perform these two separate functions. In particular, the front and rear shoulders 52, 54 have been sloped so as to engage the bearings B of the coupler C in the conventional manner. Additionally, the corners 58 have been relieved in order to reduce the maximum outside diameter D3 of the ridge 50, and the ridge 50 has been provided with an octagonal rather than a hexagonal exterior shape. These steps tend to increase the mass of metal in the ridge 50 available for engaging the bearings B of the coupler C. Note in particular FIG. 3, where the coupler C is shown as having an inside diameter D1 which is only slightly larger than the distance W1 which represents the separation between opposed parallel flats 56. In FIG. 3, D2 is used for the outside diameter of the valve body 12 in the region around the retainer 38.

Simply by way of example, in this preferred embodiment the following dimensions have been found suitable:

|  |  |
|---|---|
| D1 | 0.568 inches; |
| D2 | 0.474 inches; |
| D3 | 0.555 inches; |
| D4 | 0.555 inches; |
| W1 | 0.531 inches. |

In this preferred embodiment, W1 is 96% of D3. This arrangement has been found to provide a secure engagement between the ridge 50 and the coupler C, while still providing flats 56 that provide an adequate purchase for a wrench. In general, it is preferred that W1 be greater than 94% of D1.

The surprising result achieved with this invention is that the ridge 50 simultaneously provides flats 56 for engaging a wrench and adequate shoulders 52, 54 for engaging a quick disconnect coupler C. By using a single ridge 50 to perform both of these functions, the need for two axially separated ridges is eliminated, thereby allowing the overall length of the valve body 12 to be shortened. In this way material costs are reduced, as are the size and weight of the valve body 12.

When the coupler C is engaged on the check valve 10 as shown in FIG. 4 the support surface 23 of the port 14 provides an important support function This support surface 23 is provided with a diameter D4 which in this embodiment is equal to the diameter D3 of the ridge 50. The coupler C overlaps the support surface 23, and the support surface 23 thereby supports and aligns the coupler C on the check valve 10, and prevents any undesired tilting. The reduced diameter D2 of the valve body 12 allows the bearings B to move into the locking position shown in FIG. 4. By supporting the coupler C at two spaced regions on the check valve 10 (the ridge 50 and the support surface 23), and by positioning one of these regions on the valve body 12 and the other on the port 14, the overall length of the valve body 12 can be reduced, with the advantages discussed above.

It will be apparent that the invention embodied in the check valve 10 can be adapted for a wide range of applications. However, the following details of construction are provided in order better to define the best mode of this invention.

The valve body 12 can be formed of any suitable 17/32 inch octagonal aluminum stock, preferably of alloy #6262-T9. Of course, a brass alloy such as #345 can be used in alternative applications. The port 14 can be formed of any suitable material, such as ⅜ inch hexagonal aluminum stock, alloy #6061-T6. The core pin 32 can be formed of 15/64 inch brass stock, brass alloy #353, and the molded sealing member 34 can be formed of Neoprene. The retainer 38 can be formed of #420 or #410 stainless steel heat treated to a Rockwell hardness of Rc 30–40. Preferably, the legs 40 define an angle of about 20 degrees with respect to the side of the through passage 24 and are shaped as shown in order to reduce stress concentrations and eliminate galling or spalling of the sides of the through passage 24 when the retainer 38 is initially pushed into place. The spring 46 can be formed of material, such as #302 stainless steel 0.022 inch diameter wire. The illustrated spring 46 has a total of five coils including three active coils, and provides a spring rate of 22.96 pounds per inch. The spring 46 is preferably stress relieved at a temperature of 600 degrees F for 30 minutes and passivate cleaned. The O-ring seal 30 can be any conventional O-ring seal, such as General Motors #52450548 or equivalent. Of course, it should be understood that the foregoing materials are merely presently preferred materials, and this invention is not to be limited to the specific materials or dimensions set out above. Rather, a wide range of materials, including both ferrous and non ferrous materials for the valve body, port, and core pin, can be used. Additionally, other materials can be used for the retainer and the spring as well as the O-ring seal.

When the check valve of this invention is adapted for use with other quick disconnect couplers the dimensions illustrated above will be varied to suit the individual coupler. It is intended that the foregoing detailed description be regarded as illustrative rather than limiting, and that it be understood that it is the following claims, including all equivalents, which are intended to define the scope of this invention.

I claim:

1. In a check valve of the type comprising a valve body which defines an axially oriented through passage, an annular valve seat disposed around the passage, a groove extending at least partly around the passage; a centering element mounted in the groove to extend across the passage and having a central guide formed therein; a valve pin mounted to slide in the central guide between a sealing position, in which the valve pin seals against the valve seat to close the passage, and an open position, in which the valve pin is spaced from the valve seat to permit flow through the passage; the improvement comprising;

a raised annular ridge on the outside of the valve body, said ridge defining at least one pair of wrench flats and having first and second annular shoulders, each on a respective side of the ridge, said first shoulder shaped to retain a quick disconnect coupler in position on the valve body.

2. The invention of claim 1 wherein the annular ridge has an octagonal external shape.

3. The invention of claim 2 further comprising a quick disconnect coupler engaged with the valve body, said coupler comprising six coupler bearings arranged around the valve body and engaging the first shoulder.

4. The invention of claim 3 wherein the ridge defines a maximum outside diameter, wherein the octagonal external shape defines four pairs of parallel wrench flats, each pair separated by a characteristic distance, wherein the octagonal external shape of the annular ridge defines eight outside corners, and wherein each of the corners is relieved such that the characteristic distance is greater than 94% of the maximum outside diameter.

5. The invention of claim 4 wherein the characteristic distance is about 96% of the maximum outside diameter.

6. The invention of claim 5 wherein the wrench flats have an axial length less than the axial length of at least one of the annular shoulders.

7. The invention of claim 1 further comprising a base threadedly connected to the valve body, wherein the base defines a second passage aligned with the passage of the valve body, and wherein an O-ring seal is positioned around the valve body between the valve body and the base.

8. The invention of claim 1 further comprising:

a base threadedly connected to the valve body, wherein the base defines a second passage aligned with the passage of the valve body and a support surface; and a quick disconnect coupler engaged with the valve body and the base, said coupler comprising a plurality of coupler bearings arranged around the valve body and engaging the first shoulder, said coupler oriented on the valve body by the ridge and the support surface.

9. The invention of claim 8 wherein the support surface is annular and wherein the support surface and the ridge are substantially equal in effective outside diameter.

* * * * *